United States Patent
Wang et al.

(10) Patent No.: US 9,753,578 B2
(45) Date of Patent: Sep. 5, 2017

(54) TOUCH SENSING METHOD CAPABLE OF DYNAMICALLY ADJUSTING TOUGH THRESHOLD VALUE

(75) Inventors: Shun-Li Wang, Hsinchu (TW); Jyun-Sian Li, Tainan (TW); Chih-Chang Lai, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 761 days.

(21) Appl. No.: 13/441,013

(22) Filed: Apr. 6, 2012

(65) Prior Publication Data
US 2013/0106733 A1    May 2, 2013

(30) Foreign Application Priority Data
Oct. 27, 2011   (TW) .............................. 100138478 A

(51) Int. Cl.
  G06F 3/045   (2006.01)
  G06F 3/041   (2006.01)
  G06F 3/044   (2006.01)

(52) U.S. Cl.
  CPC ............ G06F 3/0418 (2013.01); G06F 3/044 (2013.01); *G06F 2203/04104* (2013.01)

(58) Field of Classification Search
  CPC ....................................................... G06F 3/044
  USPC ..................... 178/18.01–20.04; 345/173–178
  See application file for complete search history.

(56) References Cited

U.S. PATENT DOCUMENTS

| | | | | |
|---|---|---|---|---|
| 2010/0315372 A1* | 12/2010 | Ng | ................................ | 345/174 |
| 2011/0273399 A1* | 11/2011 | Lee | ................................ | 345/174 |
| 2012/0105367 A1* | 5/2012 | Son et al. | ..................... | 345/174 |
| 2012/0139849 A1* | 6/2012 | Syu et al. | ..................... | 345/173 |

FOREIGN PATENT DOCUMENTS

| | | |
|---|---|---|
| CN | 101526872 | 9/2009 |
| CN | 101859202 | 10/2010 |
| CN | 102004580 | 4/2011 |
| TW | 229287 | 9/1994 |
| TW | 201101685 | 1/2011 |
| TW | 201112078 | 4/2011 |
| TW | 201115444 | 5/2011 |
| TW | 201124895 | 7/2011 |
| TW | 201128499 | 8/2011 |

OTHER PUBLICATIONS

"Notice of Allowance of Taiwan Counterpart Application", issued on Mar. 12, 2014, p. 1-p. 4, in which the listed references were cited.
"Office Action of China Counterpart Application", issued on Mar. 18, 2015, p. 1-p. 8, in which the listed references were cited.

* cited by examiner

*Primary Examiner* — Hang Lin
(74) *Attorney, Agent, or Firm* — Jianq Chyun IP Office

(57) ABSTRACT

A touch sensing method for a touch panel is provided. The touch sensing method includes following steps. First, a plurality of sensing values of a plurality of sensing points are received so as to calculate a plurality of sensing difference values according to the sensing values. Next, a touch threshold value is determined according to at least one (e.g., a maximum one) of the sensing difference values. Then, the sensing difference values are compared with the touch threshold value to determine the coordinates of the touched ones of the sensing points according to the comparison result.

10 Claims, 8 Drawing Sheets

TOUCH SENSING METHOD CAPABLE OF DYNAMICALLY ADJUSTING TOUGH THRESHOLD VALUE

CROSS-REFERENCE TO RELATED APPLICATION

This application claims the priority benefit of Taiwan application serial no. 100138478, filed on Oct. 27, 2011. The entirety of the above-mentioned patent application is hereby incorporated by reference herein and made a part of this specification.

BACKGROUND OF THE INVENTION

Field of the Invention

The invention relates to a sensing method. Particularly, the invention relates to a touch sensing method of a touch panel.

Description of Related Art

Along with development of a multi-touch technique, a capacitive touch technique has become one of main streams of the touch panel techniques. Since human body is a conductor, when the human body approaches to a capacitive touch panel, a capacitance generated between a transparent electrode of the capacitive touch panel and the human body due to electrostatic binding is varied. By measuring capacitance variations of sensing lines on the capacitive touch panel, a position of a touch point is determined.

In order to detect the capacitance variations of the sensing lines, when the touch panel is manufactured, an area of the sensing lines arranged along an X-direction and a Y-direction is designed in a certain size. However, the above method may limit the number of the sensing lines, and accordingly decrease a resolution of touch coordinates.

To resolve the above problem, a technique of increasing the resolution of the touch coordinates through linear interpolation is provided. In detail, when a finger touches the touch panel, a difference between the sensing line touched by the finger and an environmental capacitance is increased to be greater than a threshold. In order to improve the accuracy of the touch coordinates, the system performs a linear interpolation operation on differences of the adjacent sensing lines to obtain exact coordinates of the touch point. However, since the number of fingers that can be resolved by the touch panel is determined by the number of the sensing lines arranged along the X-direction and the Y-direction, the number of the fingers that can be resolved by the touch panel is not increased by using the linear interpolation method. For example, when two fingers are too close to each other, the difference of the sensing line between the two fingers is also higher than the threshold, which may cause a situation that a two-point touch is mistaken as a single-point touch, and wrong touch coordinates are accordingly obtained.

On the other hand, in an ideal multi-finger touch operation, although the user generally touches the touch panel through a small-area fingertip, the user is also liable to touch the touch panel through a finger pulp to produce a large-area press. Besides, the user may often unintentionally put the palm or a thumb portion on the touch panel to cause a large-area press. In case of such large-area press, the system may misjudge one touch point as two touch points due to influences of uneven distribution of the capacitances of the touch surface and an environmental noise. Alternatively, due to influence of the noise, the measured coordinates are constantly varied along with time to cause a coordinate shift phenomenon, so that the correct touch coordinates cannot be obtained.

Therefore, the linear interpolation method used by the conventional touch panel cannot resolve the problem of coordinate misjudgement caused by inadequate distance resolution between the fingers, and coordinates of a large-area touch point cannot be correctly detected.

SUMMARY OF THE INVENTION

The disclosure is directed to a touch sensing method, by which accuracy for determining a touch position is improved.

In an aspect, the disclosure provides a touch sensing method for a touch panel. The touch sensing method includes following steps. A plurality of sensing values of a plurality of sensing points are received to calculate a plurality of sensing difference values according to the sensing values. A touch threshold value is determined according to at least one of the sensing difference values. The sensing difference values are compared with the touch threshold value to determine which one in the sensing points is touched according to a comparison result.

In an embodiment of the invention, the touch threshold value is determined according to a maximum sensing difference value of the sensing difference values.

In an embodiment of the invention, the step of determining the touch threshold value according to the maximum sensing difference value of the sensing difference values includes comparing the maximum sensing difference value with a predetermined value, and determining the touch threshold value according to a comparison result.

In an embodiment of the invention, the step of determining the touch threshold value according to the comparison result includes increasing the touch threshold value when the maximum sensing difference value is greater than the predetermined value.

In an embodiment of the invention, the step of determining the touch threshold value according to the comparison result includes decreasing the touch threshold value when the maximum sensing difference value is smaller than the predetermined value.

In an embodiment of the invention, the step of calculating the sensing difference values according to the sensing values includes calculating a plurality of original sensing difference values according to the sensing values, and performing a conversion on the original sensing difference values to generate the sensing difference values.

In an embodiment of the invention, a difference of the sensing difference values corresponding to two adjacent sensing points is greater than a difference of the original sensing difference values corresponding to the two adjacent sensing points.

In an embodiment of the invention, the conversion is a two-dimensional high-pass filtering processing.

In an embodiment of the invention, the touch sensing method further includes determining a plurality of filter parameters used in the two-dimensional high-pass filtering processing according to positions of the sensing points and the original sensing difference values.

In an embodiment of the invention, the touch sensing method further includes following steps. One or more touch regions covering the sensing points are obtained according to the sensing points. The original sensing difference values of the sensing points are used as weights to obtain one or more gravity center touch positions of the one or more touch regions according to positions of the sensing points of the one or more touch regions.

In an embodiment of the invention, the step of obtaining the one or more touch regions covering the sensing points according to the sensing points includes obtaining one or more original touch regions according to the sensing points, and expanding at least one of the one or more original touch regions to obtain the one or more touch regions.

In an embodiment of the invention, at least one of the one or more touch regions includes more than two of the original touch regions.

In an embodiment of the invention, the step of obtaining the one or more original touch regions according to the sensing points includes following steps. First, sensing points with sensing difference values greater than the touch threshold values are sequentially searched for. Then, when the sensing difference value of a sensing point is greater than the touch threshold value, it is determined whether the sensing point is adjacent to any one of the original touch regions. Then, when the sensing point is not adjacent to any one of the original touch regions, it is determined that the sensing point belongs to a new original touch region, otherwise, it is determined that the sensing point belongs to the adjacent original touch region.

According to the above descriptions, by dynamically adjusting the touch threshold value, for example, according to the maximum one of the sensing difference values, and comparing the sensing difference values with the touch threshold value to determine the touched sensing point, the touch panel can accurately detect the touched sensing point regardless of whether the sensing signal is strong or weak, so as to provide a good touch sensing function.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
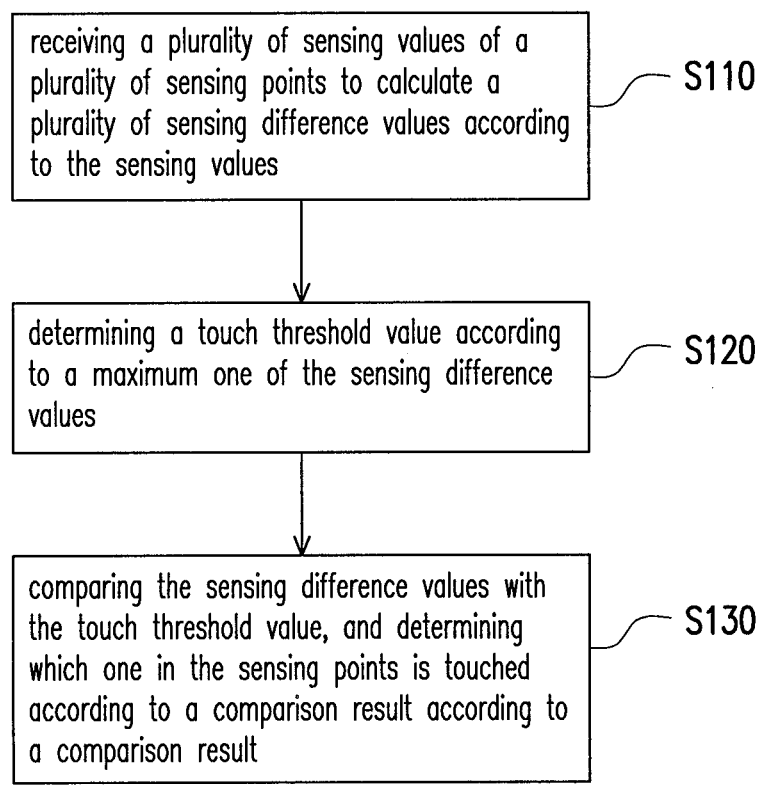
FIG. 1A is a flowchart illustrating a touch sensing method according to an embodiment of the invention.

FIG. 1A is a flowchart illustrating a touch sensing method according to an embodiment of the invention. The touch sensing method of the embodiment is adapted to a touch panel, and the touch panel is, for example, a capacitive touch panel. Referring to FIG. 1A, the touch sensing method includes following steps. First, a plurality of sensing values of a plurality of sensing points are received to calculate a plurality of sensing difference values according to the sensing values (step S110). Then, a touch threshold value is determined according to at least one (which is preferably a maximum one) of the sensing difference values (step S120). Then, the sensing difference values are compared with the determined touch threshold value to determine which one in the sensing points is touched according to a comparison result (step S130). A unique feature of the present embodiment is that the touch threshold value can be dynamically determined according to the sensing difference values, so as to improve touch detection accuracy. Detailed steps of the steps S110 to S130 are described below.

Figure 1B:
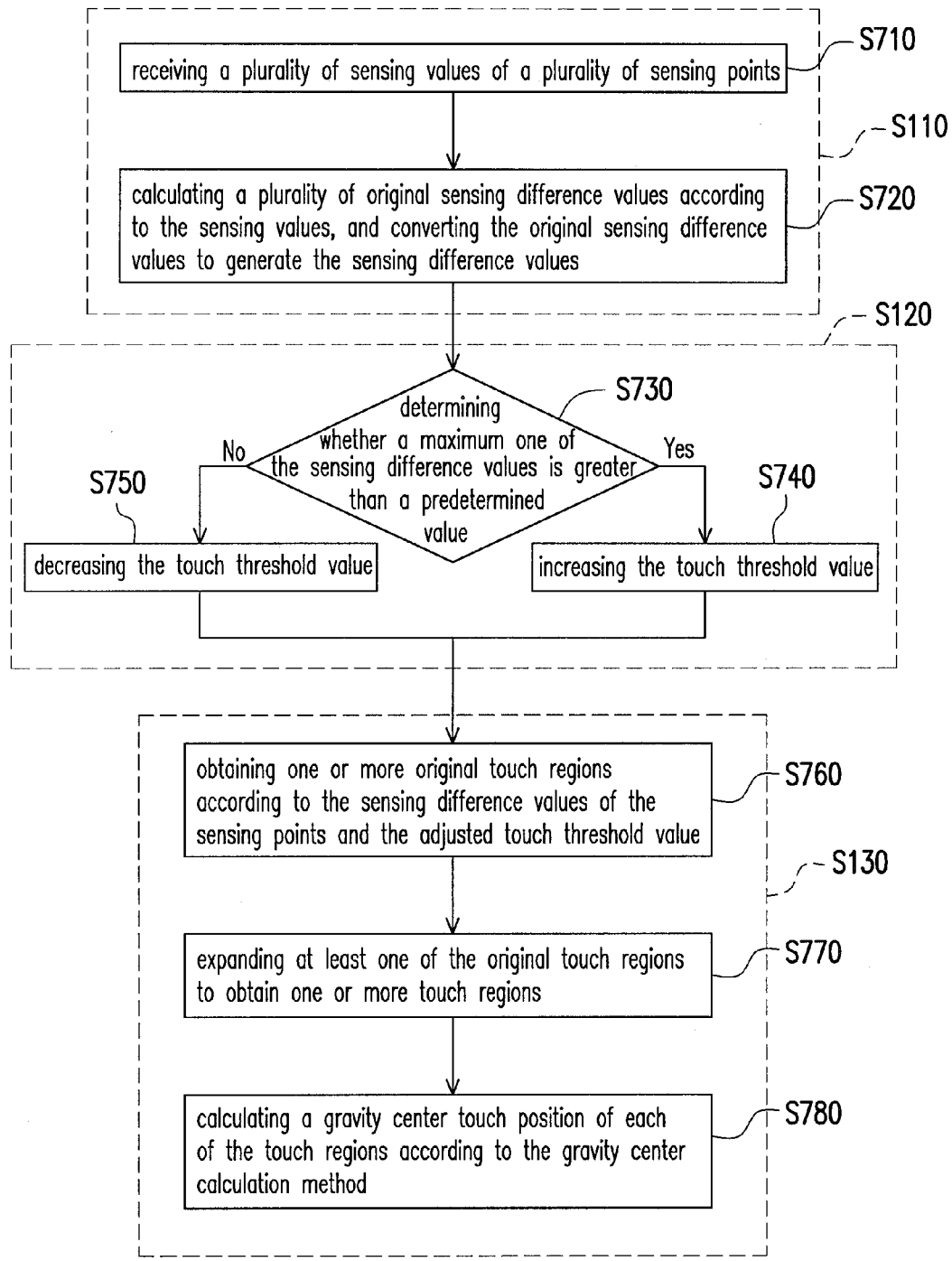
FIG. 1B is a detailed flowchart of the touch sensing method of FIG. 1A according to an embodiment.

FIG. 1B is a detailed flowchart of the touch sensing method of FIG. 1A according to an embodiment of the invention, which is used for describing detailed steps for each step of FIG. 1A. First, when the step S110 of FIG. 1A is executed to generate the sensing difference values, a sensing difference value conversion operation is preferably performed to increase differences between the sensing difference values, so as to increase the touch detection accuracy. The step S110 may include following steps. A plurality of sensing values of a plurality of sensing points are received (step S710). Then, a plurality of original sensing difference values are calculated according to the sensing values, and the original sensing difference values are converted to generate the sensing difference values (step S720). The conversion is, for example, a two-dimensional high-pass filtering processing.

Then, the step of determining the touch threshold value according to the sensing difference values (the step S120 of FIG. 1A) includes following steps. It is determined whether a maximum sensing difference value of the sensing difference values is greater than a predetermined value (step S730). When the maximum sensing difference value is greater than the predetermined value, the touch threshold value is increased (step S740). Otherwise, the touch threshold value is decreased (step S750). It should be noticed that the above method for adjusting the touch threshold value is only described as an example, and the invention is not limited thereto, and other methods capable of dynamically adjusting the touch threshold value according to the sensing difference values (regardless of whether the sensing difference values are converted) can also be applied according to design requirements. For example, in other embodiments, the touch threshold value can be adjusted according to multiple sensing difference values of the sensing difference values. In this way, the touch threshold value can be dynamically determined by one or a plurality of the sensing difference values, so as to increase the touch detection accuracy.

Moreover, when the step S130 of FIG. 1A is executed, a touch position can be calculated according to a gravity center calculation method. Moreover, original touch regions can be expanded to increase the touch detection accuracy. In detail, one or more original touch regions are obtained according to the sensing difference values of the sensing points and the adjusted touch threshold value (step S760). Then, at least one of the original touch regions is expanded to obtain the one or more touch regions (step S770). Finally, a gravity center touch position of each of the touch region is calculated according to the gravity center calculation method (step S780).

Details of the step S710 to the step S780 are described later. Moreover, it should be noticed that implementation details of various steps are illustrated in the same embodiment, though the invention is not limited thereto, and the implementation details of various steps can be separately implemented in different embodiments. For example, in other embodiments, after the touch threshold value is dynamically adjusted, other types of algorithm can be used to obtain the touch position. Alternatively, in the other embodiments, the step of converting the sensing difference values can be omitted, though the touch threshold value is still adjusted according to the aforementioned or other methods to obtain the touch regions, and accordingly obtain the touch position according to the aforementioned or other methods. Alternatively, in the other embodiments, the touch threshold value is not dynamically adjusted (i.e. a fixed touch threshold value is used), and the touch regions are expanded according to the gravity center calculation method. In other words, the steps S110 to S130 can be combined or modified according to an actual design requirement. Therefore, any implementation details using one or a plurality of the aforementioned steps S110 to S130 is considered to be within the scope of the invention.

Figure 2A:
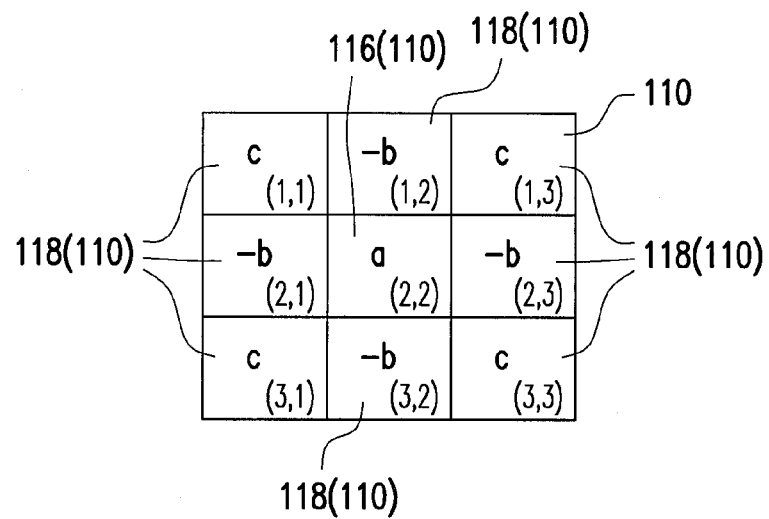
FIG. 2A is a schematic diagram of a touch panel used for describing a step S110 of FIG. 1A in an example.
Figure 2B:
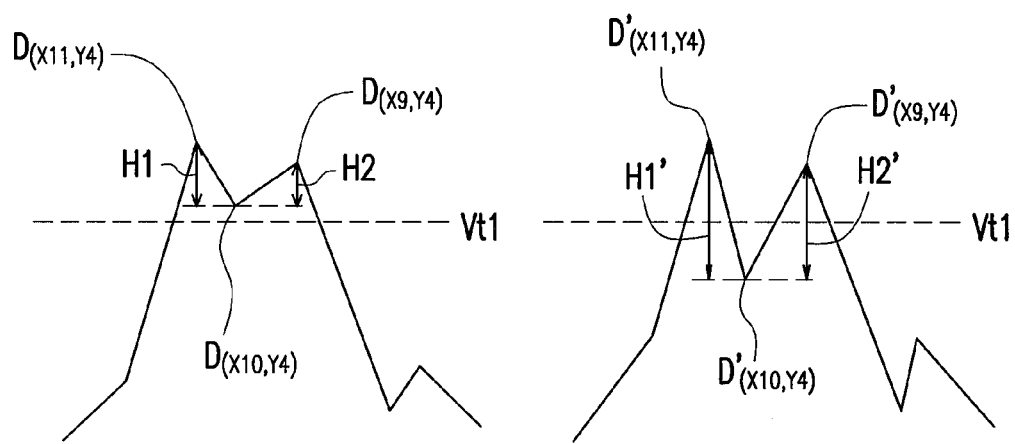
FIG. 2B is a comparison schematic diagram of original sensing difference values and sensing difference values of the method of FIG. 2A in an example.

FIG. 2A and FIG. 2B are schematic diagrams used for describing the step S110 of FIG. 1A and FIG. 1B, in which FIG. 2A is a partial simplified schematic diagram of a touch panel. In detail, only nine sensing points 110 are schematically illustrated in FIG. 2A, and each of the sensing points 110 corresponds to a filter parameter a, b or c.

In the present embodiment, the step of calculating the sensing difference values according to the sensing values (the step S110) includes following steps. First, a plurality of original sensing difference values are calculated according to the sensing values, for example, original sensing difference values $D_{(X9,Y4)}$, $D_{(X10,Y4)}$ and $D_{(X11,Y4)}$ shown at the left side of FIG. 2B. Then, the original sensing difference values are converted to generate the sensing difference values, for example, sensing difference values $D'_{(X9,Y4)}$, $D'_{(X10,Y4)}$ and $D'_{(X11,Y4)}$ shown at the right side of FIG. 2B, by which differences between the sensing difference values of different sensing points are increased to further improve the sensing accuracy. Preferably, the performed conversion is, for example, the two-dimensional high-pass filtering processing, which can be implemented by using a 3×3 two-dimensional gradient filter.

In detail, the two-dimensional high-pass filtering processing can be represented by a following equation:

$$D'_{(2,2)} = c \times D_{(1,1)} - b \times D_{(2,1)} + c \times D_{(3,1)} - b \times D_{(1,2)} + a \times D_{(2,2)} - b \times D_{(3,2)} + c \times D_{(1,3)} - b \times D_{(2,3)} + c \times D_{(3,3)}$$

Where, $D'_{(2,2)}$ is a sensing difference value of a sensing point 116, $D_{(2,2)}$ is an original sensing difference value of the sensing point 116, and $D_{(1,1)}$–$D_{(3,1)}$, $D_{(1,2)}$–$D_{(3,2)}$ and $D_{(1,3)}$–$D_{(3,3)}$ are original sensing difference values of sensing points 118 around the sensing point 116. a, b and c are filter parameters used in the two-dimensional high-pass filtering processing. It should be noticed that magnitudes of the filter parameters a, b and c can be determined according to the positions of the sensing points 110 and magnitudes of the original sensing difference values $D_{(1,1)}$–$D_{(3,1)}$, $D_{(1,2)}$–$D_{(3,2)}$ and $D_{(1,3)}$–$D_{(3,3)}$. Moreover, the filter parameters a, b and c are, for example, a>b>c.

FIG. 2B is a comparison schematic diagram of the original sensing difference values and the sensing difference values of the method of FIG. 2A. As shown in FIG. 2B, regarding the three sensing points touched by fingers, the original sensing difference values $D_{(X9,Y4)}$, $D_{(X10,Y4)}$ and $D_{(X11,Y4)}$ are respectively adjusted into the sensing difference values $D'_{(X9,Y4)}$, $D'_{(X10,Y4)}$ and $D'_{(X11,Y4)}$. It should be noticed that after such adjustment, a difference H1' between the sensing difference values $D'_{(X11,Y4)}$ and $D'_{(X10,Y4)}$ corresponding to two adjacent sensing points is greater than a difference H1 between the original sensing difference values $D_{(X11,Y4)}$ and $D_{(X10,Y4)}$ corresponding to the two adjacent sensing points. Similarly, a difference H2' between the sensing difference values $D'_{(X10,Y4)}$ and $D'_{(X9,Y4)}$ corresponding to the other two adjacent sensing points is greater than a difference H2 between the original sensing difference values $D_{(X10,Y4)}$ and $D_{(X9,Y4)}$ corresponding to the other two adjacent sensing points.

Figures 3A, 3B:
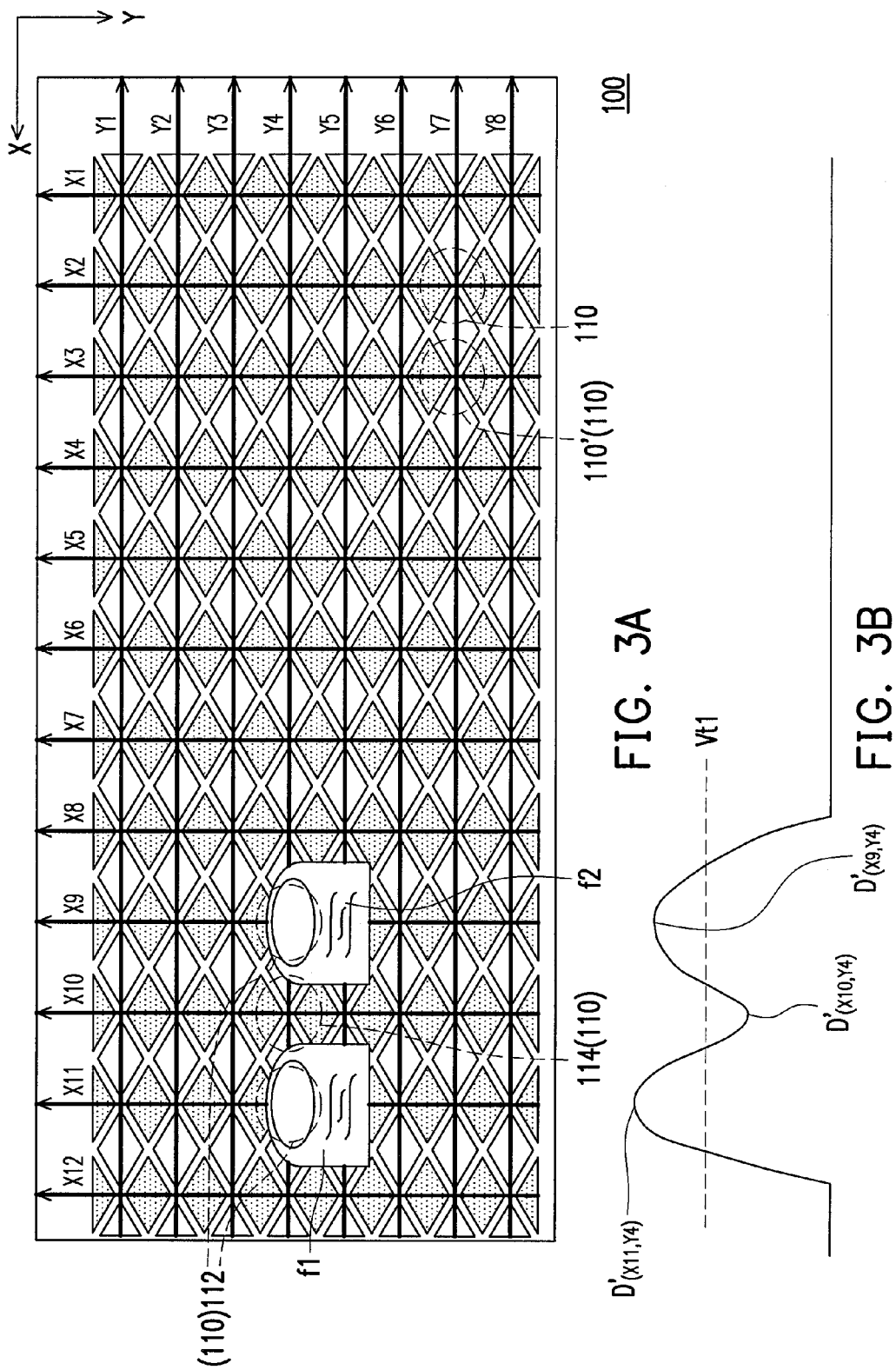
FIG. 3A is a schematic diagram of a touch panel used for describing a step S120 of FIG. 1A and FIG. 1B in an example.
FIG. 3B is a comparison schematic diagram of sensing difference values of sensing points of FIG. 3A and a touch threshold value in an example.

For example, FIG. 3A is a schematic diagram of a touch panel according to an embodiment of the invention. The aforementioned two adjacent sensing points can be sensing points 114 and 112 in FIG. 3A. After the aforementioned conversion, a touch resolution of the two sensing points 112 and 114 of FIG. 3A is enhanced, and the touch panel 100 is not liable to mistake two touch points as one touch point. In detail, as shown by the left side of FIG. 2B, in case that the original sensing difference values $D_{(X9,Y4)}$, $D_{(X10,Y4)}$ and $D_{(X11,Y4)}$ are not converted, the original sensing difference values $D_{(X9,Y4)}$, $D_{(X10,Y4)}$ and $D_{(X11,Y4)}$ are all greater than a touch threshold value Vt1, so that the two touch points are misjudged as one touch point. Comparatively, as shown by the right side of FIG. 2B, after the aforementioned conversion, since only the sensing difference values $D'_{(X9,Y4)}$ and $D'_{(X11,Y4)}$ are higher than the touch threshold value Vt1, the touch panel 100 of FIG. 3A can determine touch coordinates (X9,Y4) and (X11,Y4) of the sensing points 112 corresponding to fingers f1 and f2. In other words, by converting the original sensing difference values detected by sensing lines when the touch panel 100 is pressed, resolution of the two-finger press is enhanced, so as to effectively resolve the problem of the conventional technique that two touch points are mistaken as one touch point.

Then, referring to FIG. 3A and FIG. 3B, which are used to describe the step S120 of FIG. 1A and FIG. 1B. FIG. 3B is a comparison schematic diagram of the sensing difference values of the sensing points of FIG. 3A and the touch threshold value. In detail, a magnitude of the sensing difference value is generally varied along with a distance between the finger and the sensing line, so that if a fixed touch threshold value is taken as a reference to determine whether a touch event is occurred, wrong judgement occurs easily. However, if a magnitude of the touch threshold value is dynamically adjusted according to the sensing difference values, wrong judgement can be effectively avoided.

Referring to FIG. 3A, the touch panel 100 includes a plurality of sensing lines X1-X12 (only 12 sensing lines are schematically illustrated) and a plurality of sensing lines Y1-Y8 (only 8 sensing lines are schematically illustrated). The sensing lines X1-X12 are arranged along an X-direction, and the sensing lines Y1-Y8 are arranged along a Y-direction. The sensing lines X1-X12 and Y1-Y8 form a plurality of sensing points 110, and coordinates of the sensing points 110 are defined by the sensing lines X1-X12 and Y1-Y8. For example, coordinates of a sensing point 110' can be represented as (X3, Y7). Moreover, each of the sensing points 110 corresponds to a sensing value, and the touch panel 100 determines the touched sensing point 110 according to sensing difference values between the sensing values of the sensing points 110 and an environmental capacitance. Besides, in order to increase the accuracy of the touch coordinates, a linear interpolation operation can be performed on the sensing values of the adjacent sensing lines to obtain more detailed touch coordinates.

Referring to FIG. 3A and FIG. 3B, when the sensing points 112 on the sensing lines X9, X11 and Y4 are pressed by the fingers f1 and f2, the sensing values of the sensing points 112 are increased, so that the sensing difference values $D'_{(X9,Y4)}$ and $D'_{(X11,Y4)}$ between the sensing values of the sensing points 112 and the environmental capacitance are increased. It should be noticed that since now the fingers f1 and f2 are located right on the sensing lines X9, X11 and Y4, compared to the other sensing lines X1-X8, X10, X11-X12, Y1-Y3 and Y5-Y8, the sensing points 112 corresponding to the sensing lines X9, X11 and Y4 have larger sensing difference values $D'_{(X9,Y4)}$ and $D'_{(X11,Y4)}$. Moreover, since the sensing line X10 between the sensing lines X9 and X11 is also slightly touched by the fingers f1 and f2, the sensing difference value $D'_{(X10,Y4)}$ of the sensing point 114 corresponding to the sensing lines X10 and Y4 is smaller than the sensing difference values $D'_{(X9,Y4)}$ and $D'_{(X11,Y4)}$, and is greater than sensing difference values of the other sensing points 110. According to FIG. 3B, it is known that since only the sensing difference values $D'_{(X9,Y4)}$ and $D'_{(X11,Y4)}$ are greater than the touch threshold value Vt1, the touch panel 100 can determine the touched sensing points 110. In the present embodiment, touch coordinates of the touched sensing points 112 are, for example, (X9, Y4) and (X11, Y4). However, in an actual operation, the touch coordinates of the sensing points 112 can also be obtained according to a linear interpolation method, by which more accurate touch coordinates are obtained through interpolation of the adjacent sensing lines X9 and X10 or the adjacent sensing lines X10 and X11.

Figures 4A, 4B:
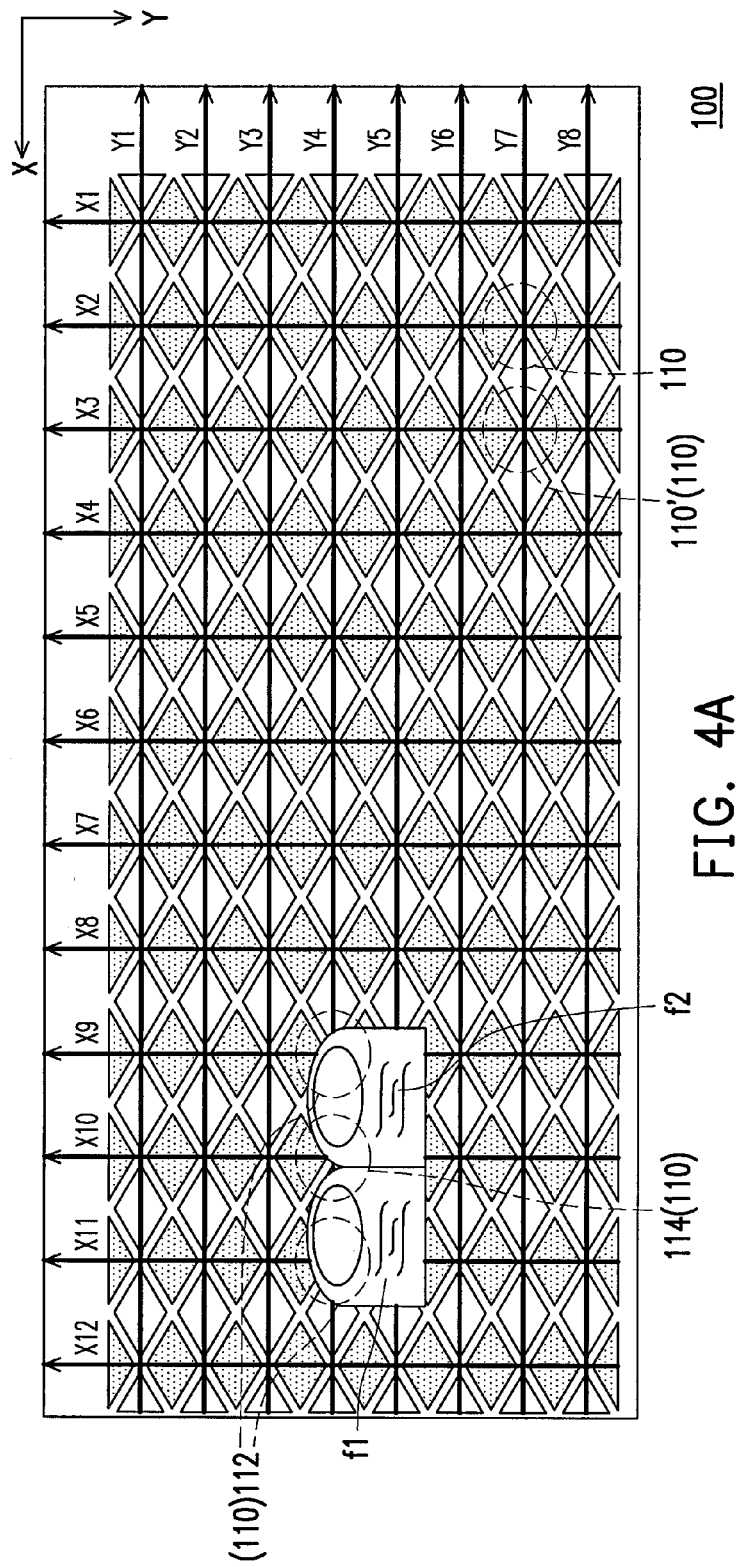
FIG. 4A is a schematic diagram of a touch panel used for describing the step S120 of FIG. 1A and FIG. 1B in an example.
FIG. 4B is a comparison schematic diagram of sensing difference values of sensing points of FIG. 4A and a touch threshold value in an example.

It should be noticed that the sensing difference values of the sensing points 110 are decreased as a distance between the fingers f1 and f2 and the sensing lines X1-X12 and Y1-Y8 increases. For example, as shown in FIG. 4A and FIG. 4B, when the fingers f1 and f2 respectively press between the two sensing lines X9 and X10 and between the two sensing lines X10 and X11 instead of pressing right on the sensing lines X9 and X11, the sensing difference values $D'_{(X9,Y4)}$ and $D'_{(X11,Y4)}$ of the sensing points 112 corresponding to the sensing lines X9, X11 and Y4 are smaller than the sensing difference values $D'_{(X9,Y4)}$ and $D'_{(X11,Y4)}$ of FIG. 3B, and the sensing difference values $D'_{(X9,Y4)}$ and $D'_{(X11,Y4)}$ of FIG. 4B are all smaller than the touch threshold value Vt1. In this way, if the touch threshold value Vt1 is fixedly taken as a reference to determine whether a touch event is occurred, the touch panel 100 may misjudge that the sensing points 112 are touched due to that the sensing difference values $D'_{(X9,Y4)}$ and $D'_{(X11,Y4)}$ are all smaller than the touch threshold value Vt1.

According to the touch sensing method provided by the embodiment of FIG. 1A and FIG. 1B, by dynamically adjusting the touch threshold value according to the sensing difference values, the aforementioned misjudgement can be effectively avoided. As shown in FIG. 4B, since the touch threshold value Vt1 is decreased to the touch threshold value Vt2, the touch panel 100 can correctly determine that the sensing points 112 are touched by the fingers f1 and f2, where the touch coordinates of the sensing points 112 are, for example, (X9, Y4) and (X11, Y4).

As described in the embodiment of FIG. 1A and FIG. 1B, in the step S120 of FIG. 1A, the touch threshold values Vt1 and Vt2 can be determined according to the maximum one of the sensing difference values (for example, the sensing difference value $D'_{(x11,Y4)}$ of the sensing points 110, and the method for determining the touch threshold values Vt1 and Vt2 includes following steps. First, the maximum sensing difference value $D'_{(x11,Y4)}$ of FIG. 3B and FIG. 4B is compared to a predetermined value (step S730). Then, the touch threshold value is determined according to the comparison result. In detail, when the maximum sensing difference value $D'_{(x11,Y4)}$ is smaller than the predetermined value, the touch threshold value is decreased (step S750). For example, the touch threshold value Vt1 is decreased to the touch threshold value Vt2. Comparatively, when the maximum sensing difference value $D'_{(x11,Y4)}$ is greater than the predetermined value, the touch threshold value is increased (step S740). Namely, the touch threshold value Vt2 is increased to the touch threshold value Vt1.

As described above, in the present embodiment, if the sensing difference value corresponding to the sensing point 110 is relatively high, the touch panel 100 selects the higher touch threshold value Vt1; otherwise, the touch panel 100 selects the lower touch threshold value Vt2. In this way, by dynamically adjusting the touch threshold value, a situation that the touch point cannot be detected due to excessively high touch threshold value or a situation that two touch points are mistaken as one touch point due to excessively low touch threshold value can be avoided. Accordingly, the touch panel can provide a good touch sensing function regardless of whether the sensing difference value is strong or weak.

Figure 5A:
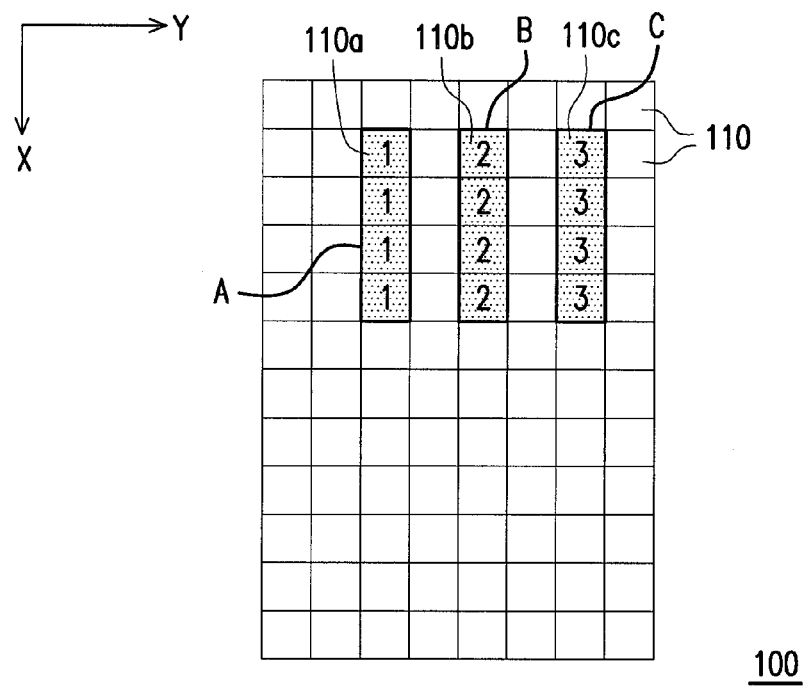
FIGS. 5A-5D are schematic diagrams of a touch panel used for describing a step S130 of FIG. 1A and FIG. 1B in an example.
Figure 5B:
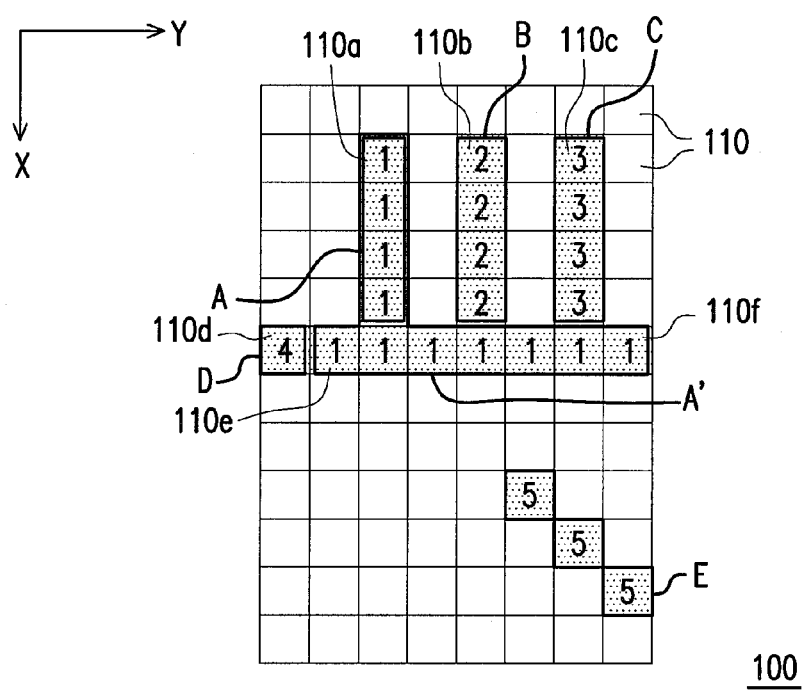
Figure 5C:
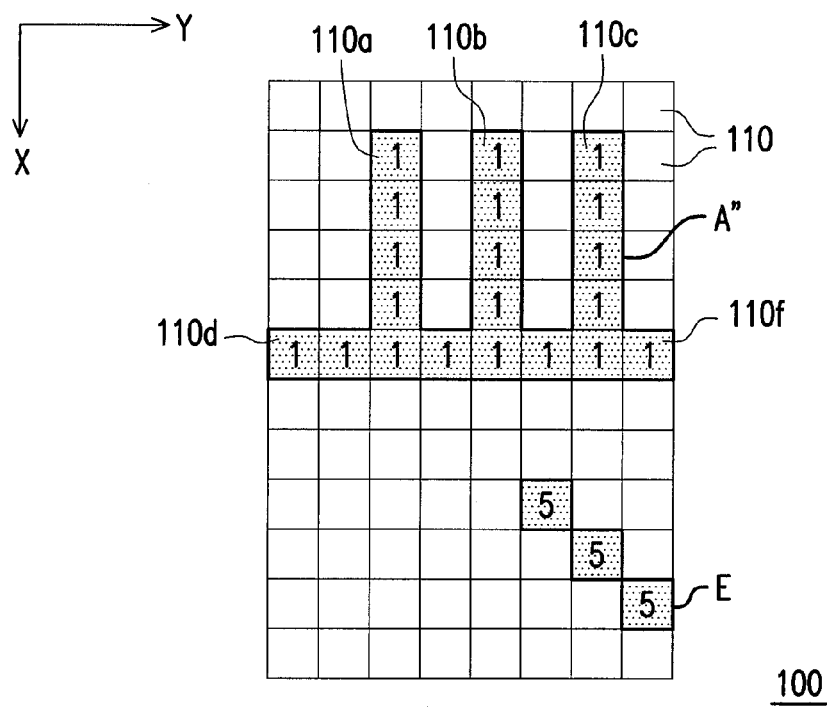
Figure 5D:
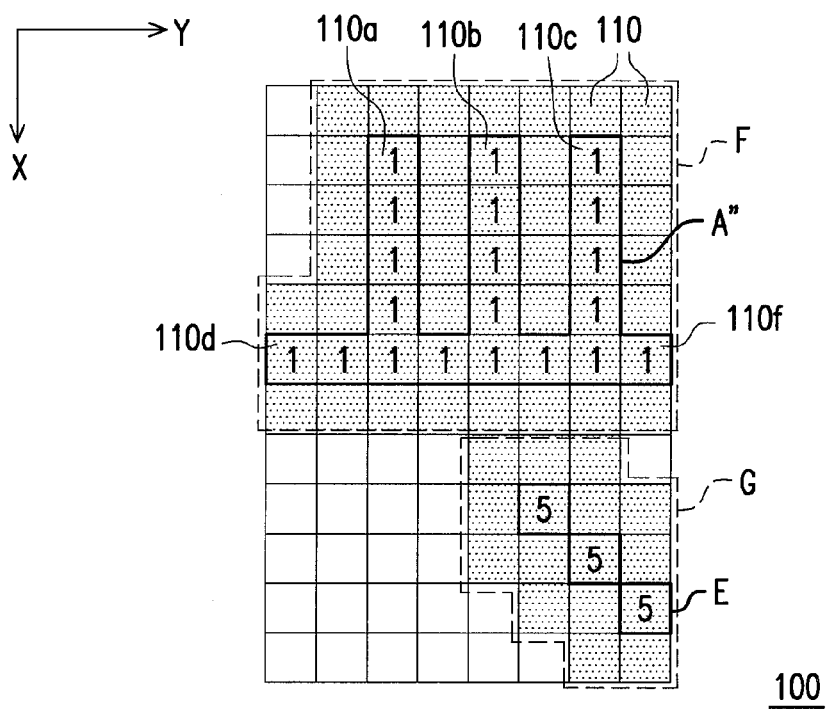
Figure 6A:
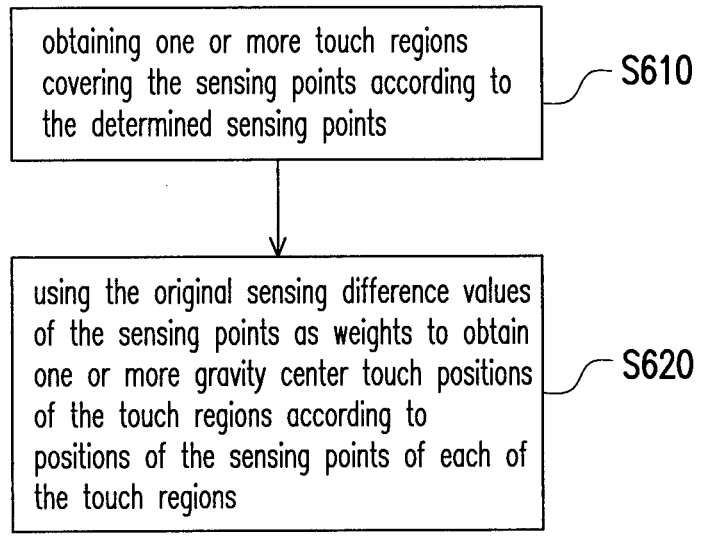
FIG. 6A is a flowchart of the step S130 of FIG. 1A according to an embodiment.
Figure 6B:
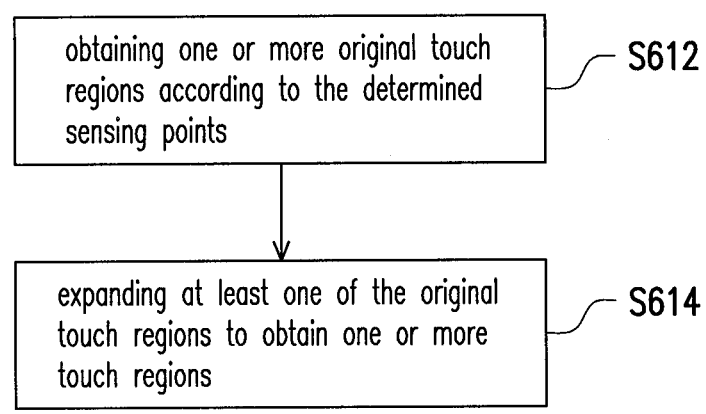
FIG. 6B is a detailed flowchart of a step S610 of FIG. 6A according to an embodiment of the invention.

Referring to FIG. 5A to FIG. 5D and FIG. 6A and FIG. 6B, which are schematic diagrams used for describing the step S130 of FIG. 1A and FIG. 1B. FIG. 6A and FIG. 6B are flowcharts illustrating detailed steps of the step S130 of FIG. 1A and FIG. 1B, and FIG. 5A-FIG. 5D are simplified schematic diagrams of the touch panel 100 of FIG. 3A, which are used to assist describing the steps of FIG. 6A and FIG. 6B.

First, referring to FIG. 6A, in the present embodiment, the touch sensing method further includes following steps. One or more touch regions covering the sensing points are obtained according to the determined sensing points (step S610). Then, the original sensing difference values of the sensing points are used as weights to obtain one or more gravity center touch positions of the touch regions according to positions of the sensing points of each of the touch regions (step S620). As shown in FIG. 6B, preferably, the step S610 includes sub steps S612 and S614. First, a plurality of original touch regions are obtained according to the determined sensing points (step S612). Then, at least one of the original touch regions is expanded to obtain one or more touch regions (step S614). In other words, the steps shown in FIG. 6A and FIG. 6B are combined to form the steps S760 to S780 of FIG. 1B.

The step S612 of FIG. 6B is described in detail below. Sequentially referring to FIG. 5A to FIG. 5C, in the step S612, by sequentially searching for the sensing points with sensing difference values higher than the touch threshold value, the original touch regions A″ and E shown in FIG. 5C are finally obtained.

First, referring to FIG. 5A, the sensing points 110 with sensing difference values higher than the touch threshold value are sequentially searched for, for example, the sensing points corresponding to the sensing difference value D'$_{(X11,Y4)}$ of FIG. 3B. In the present embodiment, searching directions of the sensing points 110 are, for example, from the left to the right and from the top to the bottom. In other words, the sensing points 110 of the same row are detected along the Y-direction, and after the sensing points 110 of the same row are detected, the sensing points 110 of the next row are detected in the same manner. As shown in FIG. 5A, when the system determines that the detected sensing points 110a are touched, regions corresponding to the sensing points 110a are marked as 1. Then, when the second touched sensing points 110b are detected, it is determined whether the sensing points 110b are adjacent to the sensing points 110a, and if not, regions corresponding to the sensing points 110b are marked as 2, and if yes, the regions are marked as 1.

Similarly, when the third touched sensing points 110c are detected, it is determined whether the sensing points 110c are adjacent to the sensing points 110a or 110b, and if not, regions corresponding to the sensing points 110c are marked as 3, and if yes, the regions are marked as 1 or 2 according to whether the sensing points 110c are adjacent to the sensing points 110a or 110b. Deduced by analogy, after a certain time of scanning, the sensing points 110 are marked as that shown in FIG. 5A, where the sensing points 110 in the regions marked as 1 form an original touch region A, the sensing points 110 in the regions marked as 2 form an original touch region B, and the sensing points 110 in the regions marked as 3 form an original touch region C.

Then, referring to FIG. 5B, when it is searched that a sensing point 110d is touched, the system continues to determine whether the sensing point 110d is adjacent to any one of the original touch regions A, B and C. In the present embodiment, since the sensing point 110d is not adjacent to any one of the original touch regions A, B and C, a region corresponding to the sensing point 110d is first marked as 4. However, since a next sensing point 110e is adjacent to the original touch region A, the system marks a region corresponding to the sensing point 110e as 1, which represents that the sensing point 110e belongs to the previously-determined original touch region A. Deduced by analogy, when the sensing point 110f is scanned, the original touch region A formed by the sensing points 110 with the regions marked as 1 is adjusted to an original touch region A'.

Besides, when all of the sensing points 110 on the touch panel 100 are scanned once, the sensing points 110 are marked as that shown in FIG. 5B, where the sensing points 110 in the regions marked as 1 form the original touch region A', the sensing points 110 in the regions marked as 2 form the original touch region B, the sensing points 110 in the regions marked as 3 form the original touch region C, the sensing point 110d in the region marked as 4 form an original touch region D, and the sensing points 110 in the regions marked as 5 form an original touch region E.

According to FIG. 5B, it is observed that besides the original touch region E, the original touch regions B, C and D are all adjacent to the original touch region A'. Therefore, the original touch regions B, C and D and the original touch region A' are taken as the same region, and the regions corresponding to the sensing points 110 in the original touch regions B, C and D are all marked as 1. Therefore, as shown in FIG. 5C, the original touch regions determined by the system are only the original touch regions A" and E. In this way, the step S612 of obtaining the original touch regions A" and E is completed.

After the step S612 of FIG. 6B is completed, the step S614 is executed to obtain one or more touch regions. In detail, as shown in FIG. 5D, the original touch regions A" and E are expanded to respectively obtain touch regions F and G.

As shown in FIG. 6A and FIG. 6B, after the sub steps S612 and S614 of FIG. 6B are executed, the step S620 is executed, by which the original sensing difference values (for example, the original sensing difference value D$_{(X11,Y4)}$ of FIG. 2B) of the sensing points 110 are used as weights to obtain a gravity center touch position of each of the touch regions F and G according to positions of the sensing points 110 of each of the touch regions F and G. For example, an X-coordinate and a Y-coordinate of the gravity center touch position can be respectively represented by following equations:

$$X = \frac{(\sum I_x \times R)}{\sum R}; Y = \frac{(\sum I_y \times R)}{\sum R}$$

Where, $I_x$ and $I_y$ are coordinates of the sensing points 110, and R is an original sensing difference value detected by the sensing line. In other words, a gravity center method is used to calculate the touch positions of the touch regions F and G.

As descried above, since the original touch regions A" and E are first expanded, and then the touch coordinates are calculated according to the sensing points 110 covered by the expanded touch regions F and G, according to the touch sensing method of the present embodiment, the coordinate shift phenomenon due to constant variation of the measured coordinates along with time caused by a large-area press in the conventional technique can be avoided. In other words, in the present embodiment, each of the touch regions F and G corresponds to a gravity center touch position. Besides, since the calculation is performed in allusion to the expanded touch regions F and G, i.e. relatively more sensing points 110 are considered in calculation of the touch coordinates, the gravity center touch position calculated according to the gravity center method can be more accurate.

In summary, in the above embodiments, by dynamically adjusting the touch threshold value, for example, according to the maximum one of the sensing difference values, and comparing the sensing difference values with the touch threshold value to determine the touched sensing point, the touch panel can accurately detect the touched sensing point regardless of whether the sensing signal is strong or weak, so as to provide a good touch sensing function. Moreover, since the above sensing difference values can be obtained through the two-dimensional high-pass filtering processing, a difference of the sensing difference values of the adjacent sensing points is greater than a difference of the original sensing difference values of the adjacent sensing points. In this way, a situation of mistaking multiple touch points as one touch point is avoided, so as to improve determination accuracy of the touched sensing points. In addition, by expanding the original touch regions to obtain the touch regions, and calculating the gravity center touch position of each of the touch regions according to the gravity center method, the coordinate shift phenomenon of the conventional technique occurred in case of a large-area press is avoided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch sensing method, adapted to a touch panel, and the touch sensing method comprising:
receiving a plurality of sensing values of a plurality of sensing points to calculate a plurality of sensing difference values according to the sensing values;
determining a touch threshold value from at least two different touch threshold values after receiving a first sensing difference value each time, which are time-independent parameters, according to a comparison result, wherein the comparison result is generated by comparing the first sensing difference value with a predetermined value, and the first sensing difference value is determined from the sensing difference values; and
comparing the sensing difference values with the touch threshold value, and determining which one in the sensing points is touched according to a second comparison result, and
increasing the touch threshold value when a maximum sensing difference value of the sensing difference values is greater than the predetermined value,
and decreasing the touch threshold value when a maximum sensing difference value of the sensing difference values is smaller than the predetermined value.

2. The touch sensing method as claimed in claim 1, wherein the step of determining the touch threshold value according to the first sensing difference value which is determined from the sensing difference values comprises determining the touch threshold value according to a maximum sensing difference value of the sensing difference values.

3. The touch sensing method as claimed in claim 1, wherein the step of calculating the sensing difference values according to the sensing values comprises:
calculating a plurality of original sensing difference values according to the sensing values; and
performing a conversion on the original sensing difference values to generate the sensing difference values.

4. The touch sensing method as claimed in claim 3, wherein a difference of the sensing difference values corresponding to two adjacent sensing points is greater than a difference of the original sensing difference values corresponding to the two adjacent sensing points.

5. The touch sensing method as claimed in claim 3, wherein the conversion is a two-dimensional high-pass filtering processing.

6. The touch sensing method as claimed in claim 5, further comprising:
determining a plurality of filter parameters used in the two-dimensional high-pass filtering processing according to positions of the sensing points and the original sensing difference values.

7. The touch sensing method as claimed in claim 3, further comprising:
obtaining one or more touch regions covering the sensing points according to the sensing points; and
using the original sensing difference values of the sensing points as weights to obtain one or more gravity center touch positions of the one or more touch regions according to positions of the sensing points of the one or more touch regions.

8. The touch sensing method as claimed in claim 7, wherein the step of obtaining the one or more touch regions covering the sensing points according to the sensing points comprises:
obtaining one or more original touch regions according to the sensing points; and
expanding at least one of the one or more original touch regions to obtain the one or more touch regions.

9. The touch sensing method as claimed in claim 8, wherein at least one of the one or more touch regions comprises more than two of the original touch regions.

10. The touch sensing method as claimed in claim 8, wherein the step of obtaining the one or more original touch regions according to the sensing points comprises:
sequentially searching for sensing points with sensing difference values greater than the touch threshold values;
when the sensing difference value of a sensing point is greater than the touch threshold value, determining whether the sensing point is adjacent to any one of the original touch regions; and
when the sensing point is not adjacent to any one of the original touch regions, determining that the sensing point belongs to a new original touch region, otherwise, determining that the sensing point belongs to the adjacent original touch region.

* * * * *